United States Patent
Chun et al.

(10) Patent No.: US 9,438,929 B2
(45) Date of Patent: Sep. 6, 2016

(54) METHOD AND APPARATUS FOR ENCODING AND DECODING AN IMAGE BY USING AN ADAPTIVE SEARCH RANGE DECISION FOR MOTION ESTIMATION

(71) Applicant: SAMSUNG ELECTRONICS CO., LTD., Suwon-si (KR)

(72) Inventors: Hyung-ju Chun, Hwaseong-si (KR); Sung-oh Kim, Suwon-si (KR); Chan-sik Park, Hwaseong-si (KR); Kyo-hyuk Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/218,273

(22) Filed: Mar. 18, 2014

(65) Prior Publication Data

US 2014/0270555 A1    Sep. 18, 2014

(30) Foreign Application Priority Data

Mar. 18, 2013 (KR) .................. 10-2013-0028823

(51) Int. Cl.
*G06K 9/36* (2006.01)
*H04N 19/57* (2014.01)

(52) U.S. Cl.
CPC .................... *H04N 19/57* (2014.11)

(58) Field of Classification Search
None
See application file for complete search history.

(56) References Cited

U.S. PATENT DOCUMENTS

| 7,720,148 | B2* | 5/2010 | Au et al. ................ 375/240.12 |
| 8,374,245 | B2* | 2/2013 | Tourapis et al. ......... 375/240.15 |
| 8,917,769 | B2* | 12/2014 | Xu et al. ................ 375/240.16 |
| 2004/0057626 | A1* | 3/2004 | Acharya et al. ............ 382/236 |
| 2006/0120452 | A1* | 6/2006 | Li ...................... 375/240.16 |
| 2006/0188019 | A1* | 8/2006 | Lin ...................... 375/240.16 |
| 2007/0195885 | A1* | 8/2007 | Liang .................... 375/240.16 |
| 2009/0003727 | A1* | 1/2009 | Perera .................. H04N 5/144 382/284 |
| 2009/0238268 | A1* | 9/2009 | Hsu et al. ............... 375/240.12 |
| 2009/0245374 | A1 | 10/2009 | Hsu et al. |
| 2010/0135390 | A1* | 6/2010 | Tourapis et al. ......... 375/240.12 |
| 2011/0103482 | A1* | 5/2011 | Lee ..................... 375/240.16 |
| 2013/0121419 | A1* | 5/2013 | Le Dinh et al. .......... 375/240.16 |
| 2014/0029664 | A1* | 1/2014 | Au et al. ................ 375/240.03 |
| 2014/0219355 | A1* | 8/2014 | Goto et al. .............. 375/240.16 |

FOREIGN PATENT DOCUMENTS

| JP | 2011-166206 A | 8/2011 |
| KR | 10-0939280 B1 | 1/2010 |

OTHER PUBLICATIONS

Li, Xiang, et al. "Fast Multi-Frame Motion Estimation Algorithm with Adaptive Search Strategies in H.264" IEEE International Conference, vol. 13, Issue 17-21, May 2004, 4 pages.*

(Continued)

*Primary Examiner* — Andrae S Allison
(74) *Attorney, Agent, or Firm* — Sughrue Mion, PLLC

(57) ABSTRACT

An encoding and decoding method and apparatus are disclosed. whereby, According to the disclosed method, in response to a current frame including a current block being a P frame, a motion vector and an intra-mode-to-inter mode ratio of a frame encoded and decoded previously to the current frame are analyzed in order to determine a temporal search range and a spatial search range of a reference frame.

20 Claims, 12 Drawing Sheets

(56) References Cited

OTHER PUBLICATIONS

Goel, S.; Ismail, Y.; Bayoumi, M.A., "Adaptive search window size algorithm for fast motion estimation in H.264/AVC standard," Circuits and Systems, 2005. 48th Midwest Symposium on, vol., No., pp. 1557,1560 vol. 2, Aug. 7-10, 2005.*

Ismaeil, I.; Docef, A.; Kossentini, F.; Ward, R., "Efficient motion estimation using spatial and temporal motion vector prediction," Image Processing, 1999. ICIP 99. Proceedings. 1999 International Conference on, vol. 1, No., pp. 70,74 vol. 1, 1999.*

Ahmad, I.; Weiguo Zheng; Jiancong Luo; Ming Liou, "A fast adaptive motion estimation algorithm," Circuits and Systems for Video Technology, IEEE Transactions on, vol. 16, No. 3, pp. 420,438, Mar. 2006.*

Communication from the Korean Intellectual Property Office dated Dec. 4, 2014, in a counterpart Korean application No. 10-2013-0028823.

* cited by examiner

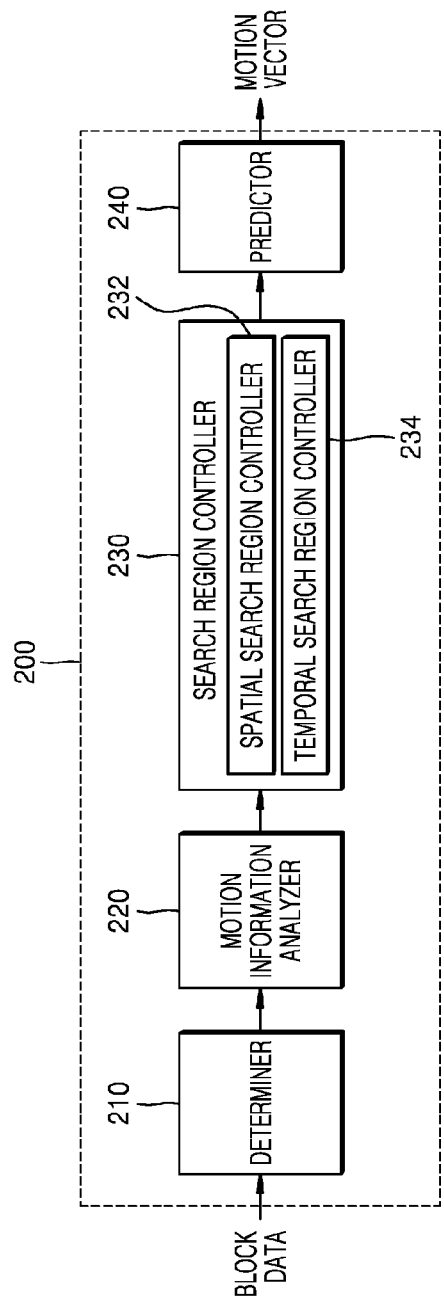
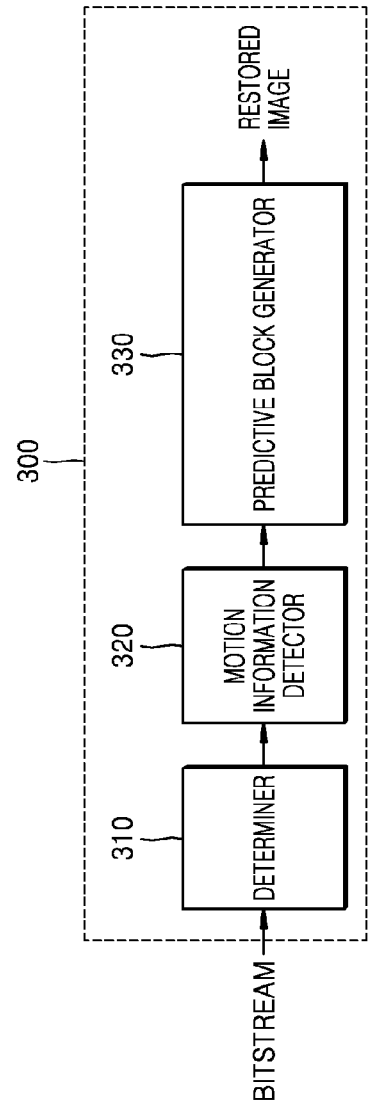

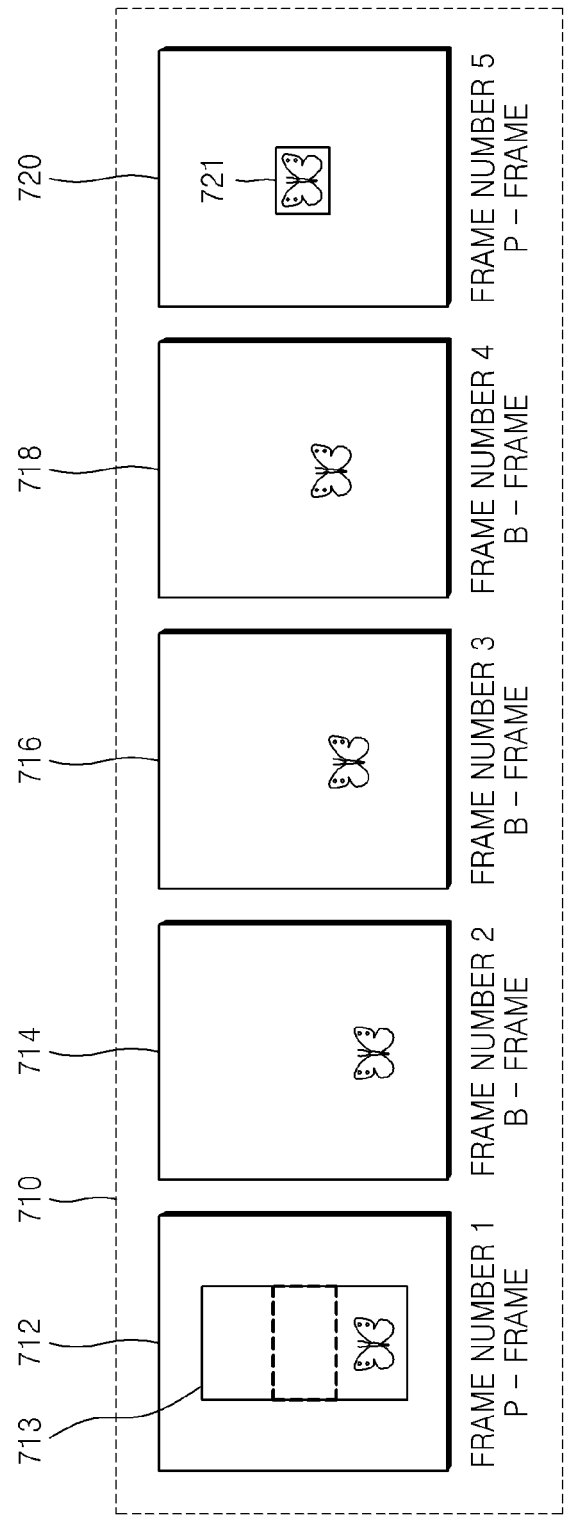

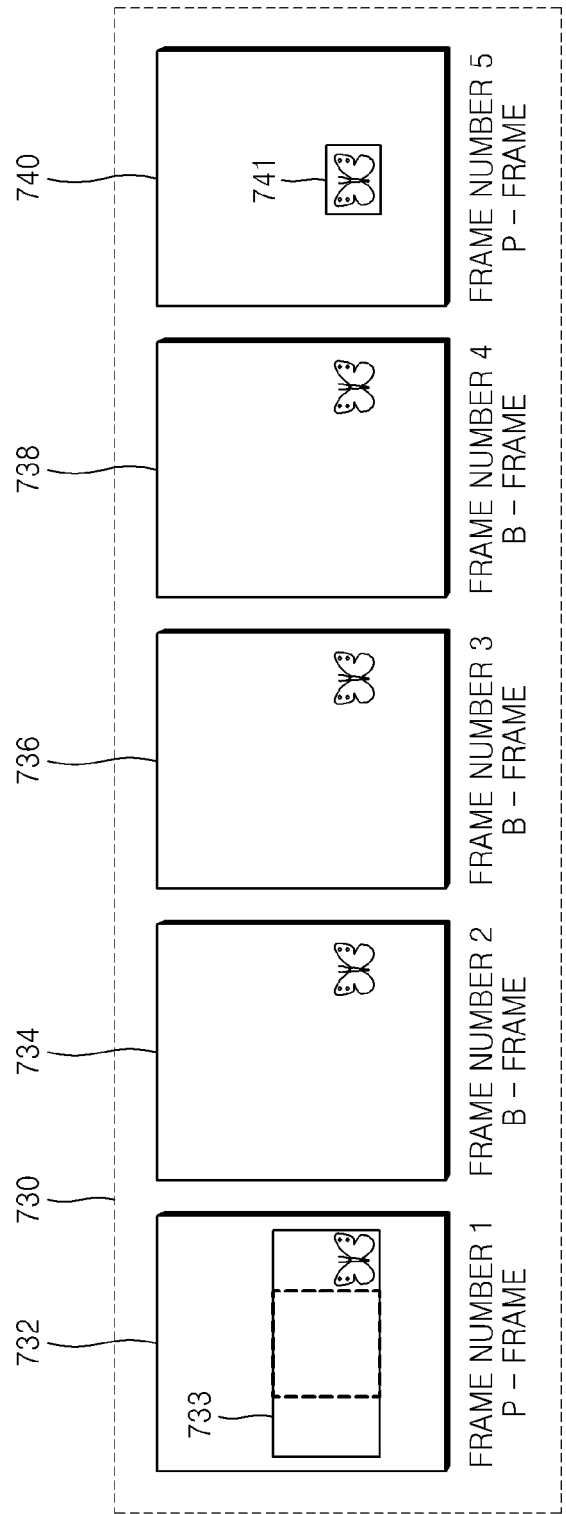

METHOD AND APPARATUS FOR ENCODING AND DECODING AN IMAGE BY USING AN ADAPTIVE SEARCH RANGE DECISION FOR MOTION ESTIMATION

CROSS-REFERENCE TO RELATED APPLICATIONS

This application claims priority from the Korean Patent Application No. 10-2013-0028823, filed on Mar. 18, 2013, in the Korean Intellectual Property Office, the disclosure of which is incorporated herein by reference, in its entirety.

BACKGROUND

1. Technical Field

Methods and apparatuses of the exemplary embodiments relate to a method and apparatus for encoding and decoding an image by using an adaptive search range decision for motion estimation.

2. Description of the Related Art

An image encoding apparatus compresses and encodes an original image, and an image decoding apparatus decompresses the compressed image.

The image encoding apparatus uses a method to remove a redundant element from image data to be transmitted to the image decoding apparatus. An estimation operation is used to remove a redundant element from the image data. In a motion estimation operation, a reference frame is searched to find a predictive block having a value nearest to a current block, and then information related to a difference between the predictive block and the current block is encoded.

In a related art motion estimation operation, a search range having a certain value is set in a reference frame, which is a frame previous to a frame including a current block. The search range has a fixed size, irrespective of a motion change of an image.

Therefore, in an image where a motion change is large, the motion change cannot be reflected in response to setting the search range. For this reason, a predictive block of a current block cannot be accurately determined, and thus, the image quality of image data transmitted to an image decoding apparatus is low.

SUMMARY

One or more exemplary embodiments include an image encoding and decoding method and apparatus, whereby a search range and a target reference frame are adjusted to increase a degree of accuracy in generating a predictive block of a current block in an image where a motion change is large, thereby preventing degradation of the quality of an image.

Additional aspects will be set forth in part in the description which follows and, in part, will be apparent from the description, or may be learned by practice of the exemplary embodiments.

According to one or more exemplary embodiments, an encoding method for an adaptive search range decision in motion estimation includes: analyzing motion information of a frame previous to a current frame which includes a current block; determining a temporal search range and a spatial search range for motion estimation of the current block according to the result of an analysis; and performing motion estimation on the current block within the determined search range to generate a motion vector of the current block.

According to one or more exemplary embodiments, a decoding method for an adaptive search range decision in motion estimation includes: detecting a motion vector of a current block from an encoded image; and generating, by using the motion vector, a predictive block included in a temporal search range and a spatial search range that are determined according to an information analysis result of a frame previous to a current frame which includes a current block.

According to one or more exemplary embodiments, an encoding apparatus for an adaptive search range decision in motion estimation includes: a motion information analyzer configured to analyze motion information of a frame previous to a current frame which includes a current block; a search region controller configured to determine, according to an analysis result and within a memory limit, a temporal search range and a spatial search range for motion estimation of the current block; and a predictor configured to perform motion estimation on the current block within the determined search range in order to generate a motion vector of the current block.

According to one or more exemplary embodiments, a decoding apparatus for an adaptive search range decision in motion estimation includes: a motion information detector configured to detect a motion vector of a current block from an encoded image; and a predictive block generator configured to generate, by using the motion vector, a predictive block included in a temporal search range and a spatial search range that are determined according to a a result of an analysis of motion information of a frame previous to a current frame which includes a current block.

An aspect of an exemplary embodiment may provide an encoding apparatus for an adaptive search range decision in motion estimation, the encoding apparatus including: a determiner configured to determine whether a frame which includes a current block is a P frame; a motion information analyzer configured to analyze motion information of a frame previous to a current frame which includes a current block; a search region controller including a spatial search region controller, a temporal search region controller; wherein the temporal search region controller is configured to determine a temporal search range, the spatial search region controller is configured to determine a spatial search range, and wherein the temporal search range and spatial search range are used by the temporal search region controller and spatial search range controller for motion estimation of the current block and within a memory limit; and a predictor configured to perform motion estimation on the current block within the determined search range in order to generate and output a motion vector of the current block.

BRIEF DESCRIPTION OF THE DRAWINGS

These and/or other aspects will become apparent and more readily appreciated from the following description of the exemplary embodiments, taken in conjunction with the accompanying drawings of which:

FIG. 2 is a block diagram which illustrates an image encoding apparatus according to an exemplary embodiment;

FIG. 3 is a block diagram which illustrates an image decoding apparatus according to an exemplary embodiment;

FIG. 7A is a diagram which illustrates an example in which a spatial search range and a temporal search range are adjusted when a motion is large in a y-axis direction according to an exemplary embodiment;

FIG. 7B is a diagram which illustrates an example in which a spatial search range and a temporal search range are adjusted when a motion is large in an x-axis direction according to an exemplary embodiment;

DETAILED DESCRIPTION OF THE EXEMPLARY EMBODIMENTS

Figure 1A:
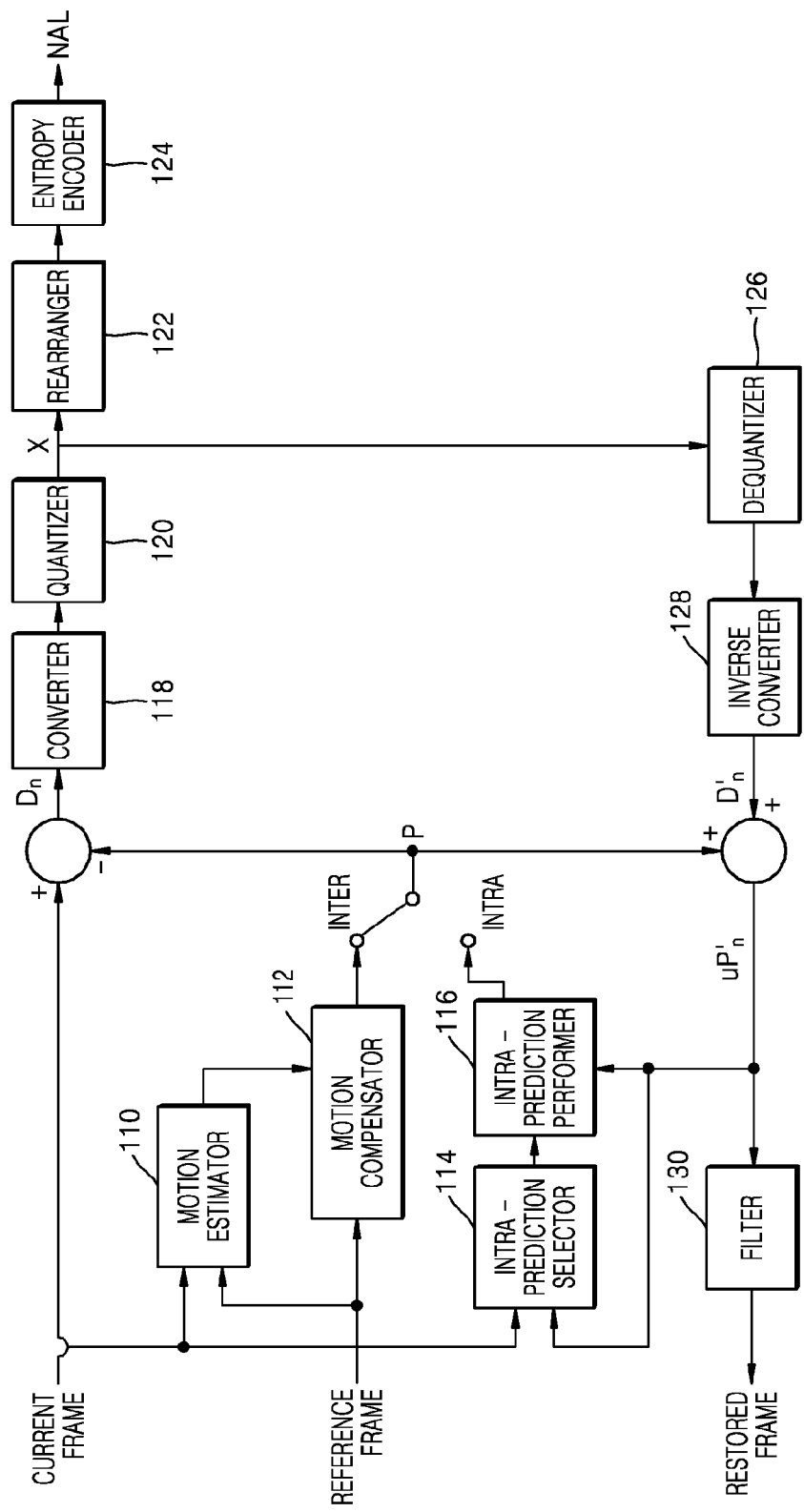
FIG. 1A is a diagram which illustrates a configuration of an encoding apparatus using an adaptive search range decision in motion estimation according to an exemplary embodiment.

Reference will now be made in detail to the exemplary embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to explain aspects of the present description.

An object of an exemplary embodiment is of course not to restrict or limit the scope of the disclosure and is intended to embody the exemplary embodiments. Technical experts in the field from the detailed description and examples of the exemplary embodiments can be inferred easily be interpreted as falling within the scope of the claims.

FIG. 1A is a diagram which illustrates a configuration of an encoding apparatus using an adaptive search range decision in motion estimation according to an exemplary embodiment. Referring to FIG. 1A, an image encoding apparatus includes a motion estimator 110, a motion compensator 112, an intra-prediction selector 114, an intra-prediction performer 116, a converter 118, a quantizer 120, a rearranger 122, an entropy encoder 124, a dequantizer 126, an inverse converter 128 and a filter 130. In FIG. 1, an adaptive search range decision according to an exemplary embodiment is made by the motion estimator 110.

The motion estimator 110 estimates a motion for an input block, and the motion compensator 112 compensates for the motion. Motion estimation denotes predicting a current block by using a previous reference frame stored in a memory. In particular, the motion estimator 110 adaptively determines a search range in motion estimation according to an exemplary embodiment.

The intra-prediction selector 114 and the intra-prediction performer 116 perform intra-estimation on the input block. The converter 118 and the quantizer 120 converts and quantizes a residue, which is obtained by subtracting the original image data from inter-prediction or intra-prediction image information, to output a conversion block composed of a plurality of quantized conversion coefficients. The entropy encoder 124 variable-length-encodes the variable block to output the encoded variable block as a bitstream.

Figure 1B:
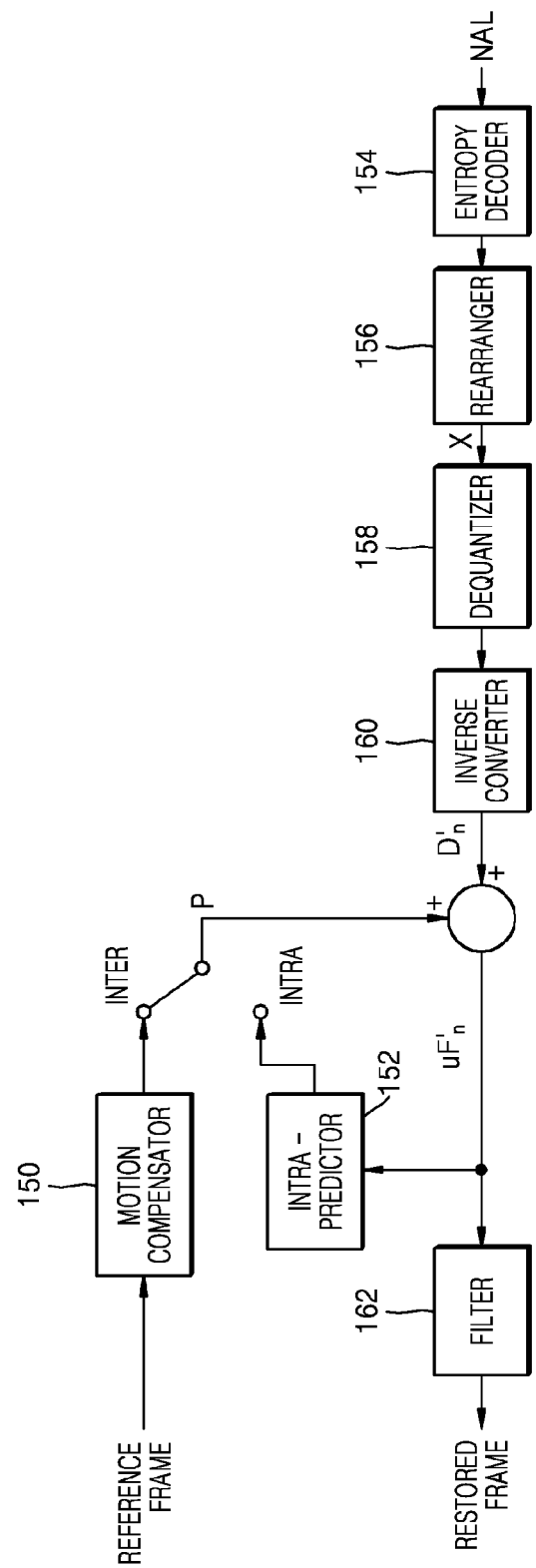
FIG. 1B is a diagram which illustrates a configuration of a decoding apparatus using an adaptive search range decision in motion estimation according to an exemplary embodiment.

FIG. 1B is a diagram which illustrates a configuration of an image decoding apparatus using an adaptive search range decision in motion estimation according to an exemplary embodiment. Referring to FIG. 1B, the image decoding apparatus includes a motion compensator 150, an intra-predictor 152, an entropy decoder 154, a rearranger 156, a dequantizer 158, an inverse converter 160, and a filter 162. The motion compensator 150 of FIG. 1B compensates for a motion by using a selected prediction block within a search range that is adaptively determined according to an exemplary embodiment.

The entropy decoder 154 decodes an input bitstream, and the dequantizer 158 and the inverse converter 160 dequantizes and inversely converts decoded data to output prediction image information and a residue. The motion compensator 150 compensates for a motion by using the prediction image information and the residue. In particular, the motion compensator 150 compensates for the motion by using a selected prediction block within a search range that is adaptively determined according to an exemplary embodiment o.

FIG. 2 is a block diagram which illustrates an image encoding apparatus according to an exemplary embodiment.

Referring to FIG. 2, the image encoding apparatus according to an exemplary embodiment may include a determiner 210, a motion information analyzer 220, a search region controller 230, and a predictor 240.

The determiner 210 determines whether a frame which includes a current block is a P frame, and in response to a determination that the frame including the current frame is the P frame, a series of search range determining operations according to an exemplary embodiment are performed. In response to a determination that the frame including the current frame is not the P frame, a search range is determined according to an algorithm of the related art. The kinds of frames are relevant to a coding scheme, and a coding scheme applied in video compression may be divided into an intra-frame coding scheme and an inter-frame coding scheme.

In the intra-frame coding scheme, an original screen by using a spatial relationship of a frame to compress, and a frame encoded through intra-frame coding is referred to as an I frame. In the inter-frame coding scheme, a video is compressed in consideration of both a temporal characteristic of a current screen and a temporal relationship with a peripheral screen, and a predictive (P) frame and a bidirectional (B) frame are used in inter-frame coding. The P frame denotes a frame that is compressed in consideration of a relationship with a previous frame, and the B frame denotes a frame that is compressed by simultaneously considering two frames.

The image coding and decoding method and apparatus according to an exemplary embodiment are applied in the case of the P frame. The P frame is more sensitive to an image in which a frame interval is broad and a motion is large, and thus, an image quality is generally improved. Also, the P frame becomes a reference frame of the B frame even in response to the number of frames being less than the B frame, and thus, by applying the image coding and decoding method and apparatus according to an exemplary embodiment in the case of the P frame, an image quality is greatly improved, and a system complexity is maintained.

Moreover, the image coding and decoding method and apparatus according to an exemplary embodiment may also be applied in the case of an image slice. In the following description, the image coding and decoding method and apparatus according to an exemplary embodiment will be described in terms of a frame as an example.

The motion information analyzer 220 analyzes motion information of a P frame previous to a P frame including a current block. The motion information includes information related to an intra-mode to-inter mode ratio and a motion vector size distribution of the previous P frame.

The intra-mode to-inter mode ratio composing the motion information will now be described.

The intra mode-to-inter mode ratio according to an exemplary embodiment is a ratio of I and P blocks and a B block which are input previously to a P frame including a current block. The I block is a block predicted through intra-prediction, the P block is a block predicted for a unidirectional motion, and the B block is a block predicted for a bidirectional motion. For example, in frames previous to the P frame including the current block, in response to the number of I blocks being 'a' number and the number of P blocks and B blocks is 'b', the intra-mode to-inter mode ratio is a:b.

The motion vector composing the motion information is position information in which a most matching region in a current block and a reference frame are represented as a relative position of a position of the current block.

In an exemplary embodiment, a frame which is encoded and decoded previously to a P frame including a current block is set as a reference frame, and a spatial search range is determined based on a motion vector size distribution of the reference frame. Specifically, in response to the sum motion vectors in an x-axis direction being greater by a certain value or more than a sum of motion vectors in a y-axis direction in the motion vector size distribution of the reference frame, an x-axis length (i.e., a width length of a search range) is enlarged. On the other hand, in response to the sum of motion vectors in the y-axis direction being greater by a certain value or more than the sum of motion vectors in the x-axis direction vectors, a y-axis length (i.e., a longitudinal length of the search range) is enlarged.

For example, in response to a difference between the sum of motion vectors in the x-axis direction and the sum of motion vectors in the y-axis direction being less than a certain value, the spatial search range is maintained as a basic value without being enlarged. In this case, the certain value is a value that varies according to an input signal.

In an exemplary embodiment, the total sum of motion vector distributions targets all of the reference frame. However, the total sum of motion vector distributions for a partial region of the reference frame may also be used.

A motion vector determination method is not limited to the above-described example that compares the sum of vectors in the x-axis direction and the sum of vectors in the y-axis direction, and various methods of determining a motion vector of a reference frame may be further applied.

For example, a method that compares the sum of vectors in the x-axis direction and the sum of vectors in the y-axis direction to determine a motion vector of a reference frame may also be applied as an example for determining the motion vector.

The search region controller 230 adjusts a spatial search range and a temporal search range according to a result of a motion information analysis. The spatial search range is determined by a spatial search region controller 232, and the temporal search range is determined by a temporal search region controller 233.

Specifically, in response to an intra-mode to-inter mode ratio being less than a certain value, the spatial search range is enlarged, and since a memory has limited capacity, the temporal search range is limited so as not to exceed the memory limit.

For example, under a condition where a basic value of the spatial search range is 64×64 and the temporal search range is up to an n−2nd frame previous to a second frame, in response to the intra mode-to-inter mode ratio is less than a certain value, the spatial search range is enlarged to 96×96, and a frame able to operate as a temporary reference is limited up to an n−1st frame.

On the other hand, in response to the intra-mode to-inter mode ratio exceeding the certain value, the spatial search range is adjusted in consideration of a motion vector.

For reference, adjusting the spatial search range is performed based on a motion vector of a frame which is encoded and decoded previously to a current frame. In the above-described example, in response to the sum of vectors in the x-axis direction being greater by a certain value or more than the sum of vectors in the y-axis direction, the spatial search range is enlarged in a width direction; otherwise, the spatial search range is enlarged in a length direction.

The predictor 240 finds a predictive block having a few errors by using a current block within a search range determined by the search region controller 230, and generates a motion vector and a prediction signal including a motion vector (representing a position of the predictive block) and error data representing a difference between the current block and the predictive block.

FIG. 3 is a block diagram which illustrates an image decoding apparatus according to an exemplary embodiment.

Referring to FIG. 3, the image decoding apparatus according to an exemplary embodiment may include a determiner 310, a motion information detector 320, and a predictive block generator 330.

The determiner 310 determines whether a frame including a current block is a P frame.

The motion information detector 320 detects a prediction signal and motion vector of the current block from data that is obtained by performing entropy decoding, inverse rearrangement, dequantization, and inverse conversion operations on a bitstream obtained by encoding an image.

The predictive block generator 330 generates a predictive block included in a temporal search range and a spatial search range that are determined by analyzing motion information of a frame, which is encoded and decoded previously to the P frame including the current block, by using the motion vector.

The predictive block is generated by using the prediction signal and the motion vector which are detected by the motion information detector 320.

Figure 4:
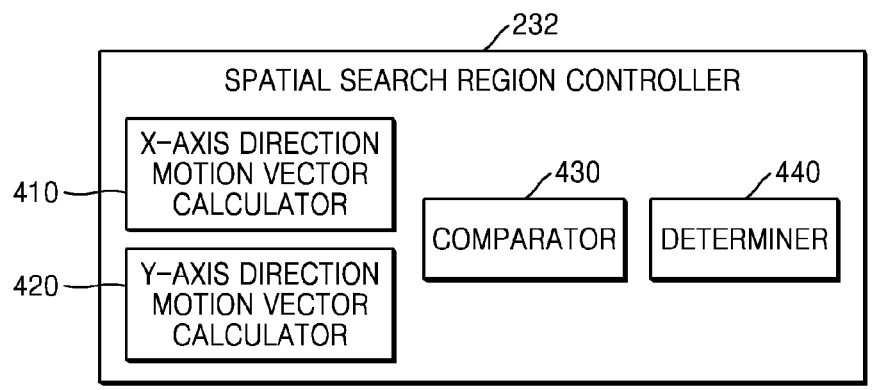
FIG. 4 is a diagram which illustrates a spatial search region controller according to an exemplary embodiment.

FIG. 4 is a diagram which illustrates a spatial search region controller 232 according to an exemplary embodiment.

Referring to FIG. 4, the spatial search region controller 232, according to an exemplary embodiment may include an x-axis direction motion vector calculator 410, a y-axis direction motion vector calculator 420, a comparator 430, and a determiner 440.

The x-axis direction motion vector calculator 410 calculates the total sum of motion vectors in the x-axis direction of a frame which is encoded and decoded previously to a current frame. The total sum of motion vectors may target the whole frame, or may target only a portion of the frame, according to a setting.

The y-axis direction motion vector calculator 420 calculates the total sum of motion vectors in the y-axis direction of a frame which is encoded and decoded previously to a frame which includes a current block.

The comparator 430 compares a size of the total sum of motions vectors in the x-axis direction and a size of the total sum of motion vectors in the y-axis direction to determine a spatial search range.

Specifically, an assumption is made that a difference between the size of the total sum of motion vectors in the x-axis direction and the size of the total sum of motion vectors in the y-axis direction for vertically or horizontally enlarging the spatial search range is 10. The difference of 10 is an arbitrarily set value, and may be changed according to an input signal.

In response to a value of the difference being set as a small value, the spatial search range is changed despite the difference between the size of the total sum of motion vectors in the x-axis direction and the size of the total sum of motion vectors in the y-axis direction being small, and thus, is more sensitive to a change in directionality of a motion vector.

In an exemplary embodiment, in response to the size of the total sum of motion vectors in the x-axis direction being greater by 10 or more than that of the total sum of motion vectors in the y-axis direction in the motion vector size distribution of the reference frame, an x-axis direction length (i.e., a width length of a search range) is enlarged. On the other hand, in response to the size of the total sum of motion vectors in the y-axis direction being greater by 10 or more than that of the total sum of motion vectors in the x-axis direction, a y-axis direction length (i.e., a longitudinal length of the search range) is enlarged. In response to the size of the total sum of motion vectors in the x-axis direction being less by 10 or more than the total sum of motion vectors in the y-axis direction in the motion vector size distribution of the reference frame the y-axis direction length is enlarged.

For example, in response to a value between the difference between the size of the total sum of motion vectors in the x-axis direction and the size of the total sum of motion vectors in the y-axis direction being less than 10, the spatial search range is maintained as a basic value without being enlarged.

Figure 5:
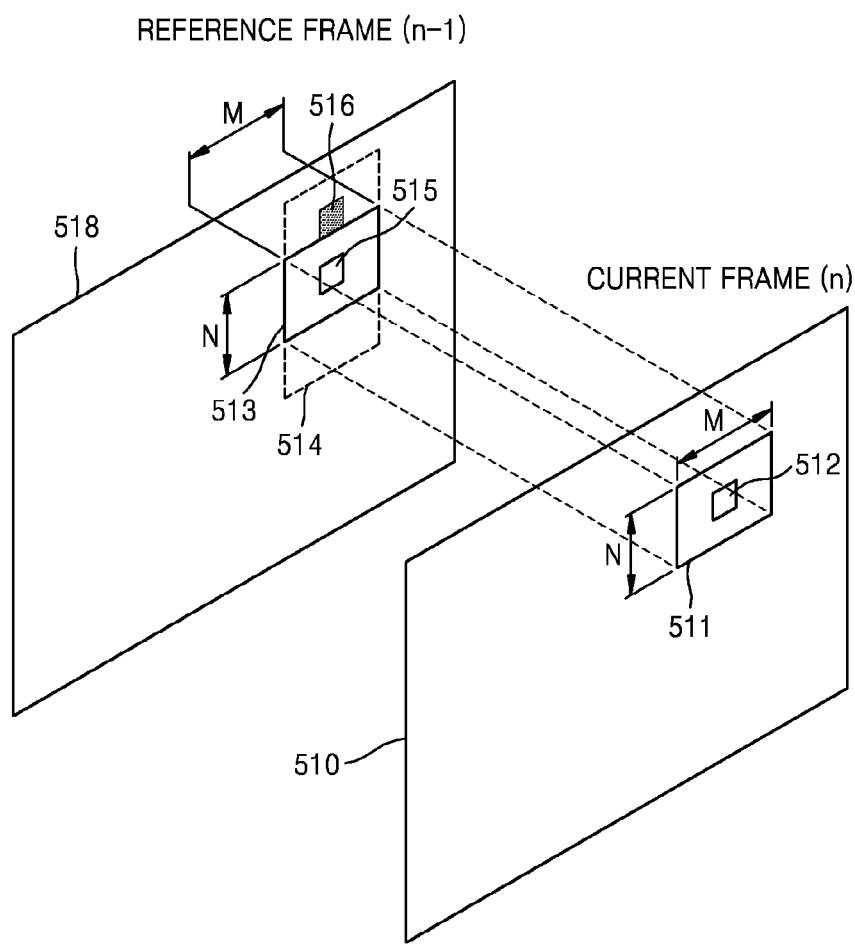
FIG. 5 is a diagram which illustrates motion estimation according to an exemplary embodiment.

FIG. 5 is a diagram which illustrates motion estimation according to an exemplary embodiment. A frame encoded and decoded previously to a current frame is selected as a reference frame 518 for a current P frame including a current block 512. An assumption is made that a basic value of a search range is M×N, and a motion vector of the reference frame 512 is in a length direction.

In an exemplary embodiment, a block 516 that matches the most the current block 512 is not within a search range of a basis value. However, in response to a search range of the reference frame 518 being enlarged (514) by an adaptive motion estimation search range determining method according to an exemplary embodiment, the block 516 that most closely matches the current block 512 may be selected, unlike the search range of the basic value.

Figure 6A:
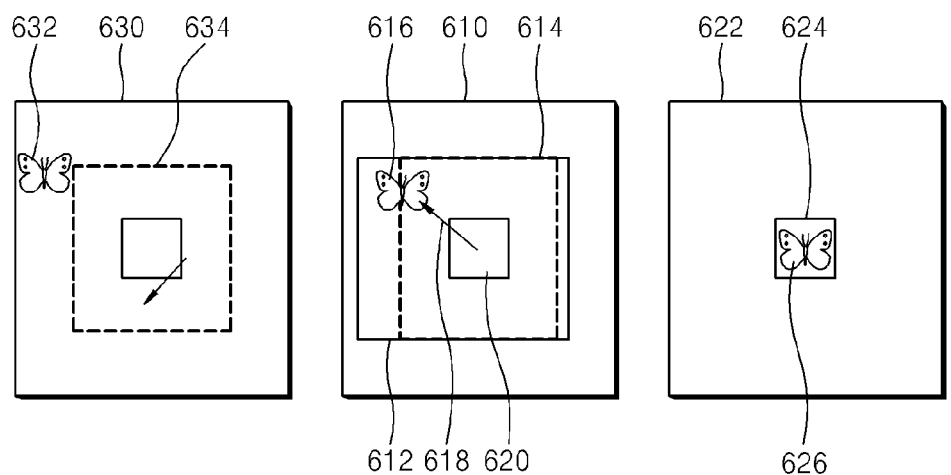
FIG. 6A is a diagram which illustrates an example in which a width ratio of a spatial search range is enlarged, based on a motion vector according to an exemplary embodiment.

FIG. 6A is a diagram which illustrates an example in which a width ratio of a spatial search range is enlarged based on a motion vector, according to an exemplary embodiment. In FIG. 6A, in the sum 618 of motion vectors of a frame 610 which is encoded and decoded previously to a P frame 622 which includes a current block 624, the sum of motion vectors in the y-axis direction is greater by a certain value or more than the sum of motion vectors in the x-axis direction.

Therefore, a spatial search range of a basic value 614 is enlarged (612) in a width direction according to the total sum of motion vectors of a previous frame 610. In the example, a memory is completely used by enlarging the spatial search range, and thus, a temporal search range is not enlarged (630). In another example of the exemplary embodiments, in response to a residual area of the memory existing even after the spatial search range is enlarged, the temporal search range is enlarged within the memory limit, and thus, a search range may be applied even to a frame 630 which is encoded and decoded before the second frame prior to a current P frame.

Figure 6B:
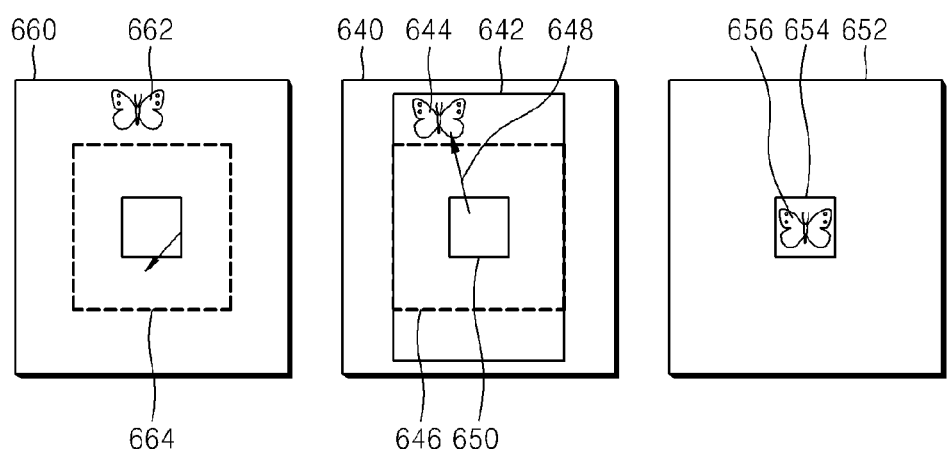
FIG. 6B is a diagram which illustrates an example in which a length ratio of a spatial search range is enlarged based on a motion vector according to an exemplary embodiment.

FIG. 6B is a diagram which illustrates an example in which a length ratio of a spatial search range is enlarged based on a motion vector according to an exemplary embodiment. In FIG. 6B, in the sum 648 of motion vectors of a frame 640 which is encoded and decoded previously to a P frame 652 including a current block 654, the sum of motion vectors in the y-axis direction is greater by a certain value or more than the sum of motion vectors in the x-axis direction.

Therefore, a spatial search range of a basic value 646 is enlarged (612) in a length direction according to the total sum of motion vectors of a previous frame 640. In the example, a memory is completely used by enlarging the spatial search range, and thus, a temporal search range is not enlarged (660). In another example of the previously embodiments, in response to a residual area of the memory existing even after the spatial search range is enlarged, the temporal search range is enlarged within the memory limit, and thus, a search range may be applied even to a frame 660 which is encoded and decoded before the second frame prior to a current P frame.

Figure 6C:
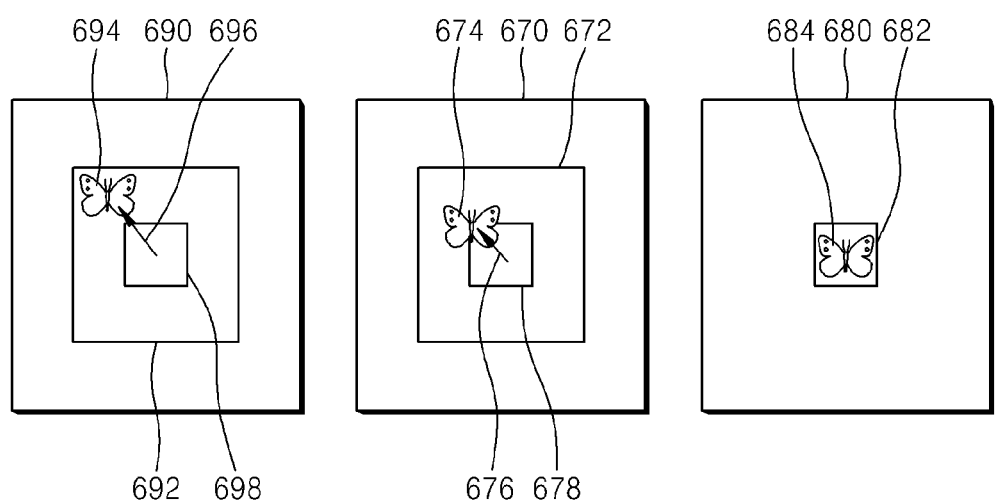
FIG. 6C is a diagram which illustrates an example in which a spatial search range is set to a basic value and a temporal search range is enlarged based on a motion vector according to an exemplary embodiment.

FIG. 6C is a diagram which illustrates an example in which a spatial search range is set to a basic value and a temporal search range is enlarged based on a motion vector according to an previously embodiment. In FIG. 6C, a directionality of a motion vector of a frame 670, which is encoded and decoded previously to a P frame 680, which includes a current block 682, is not specified.

Therefore, a spatial search range 672 in the previous frame 670 is maintained as a basic value. In the above-described example, since a spatial search range is not enlarged, a temporal search range is enlarged within a memory limit, and thus, a search range may be applied even in the case of a frame 690 which is encoded and decoded before the second frame prior to a current P frame.

FIG. 7A is a diagram which illustrates an example in which a spatial search range and a temporal search range are adjusted in response to a motion being large in a y-axis direction, according to an exemplary embodiment. In the exemplary embodiment of FIG. 7A, a GOP 710 is IBBBP, and a frame number 1 712 that is a frame encoded and decoded prior to processing a frame number 5 720 is a reference frame.

In the frame number 1 712, it is assumed that a motion is large in a length direction, and an intra-mode to inter-mode ratio is large. In this case, a predictive block of a current block included in the frame number 5 720 is found by enlarging (713), a search range in the frame number 1 712, in a length direction.

FIG. 7B is a diagram which illustrates an example in which a spatial search range and a temporal search range are adjusted in response to a motion being large in an x-axis direction, according to an exemplary embodiment. In the exemplary embodiment of FIG. 7B, a GOP 730 is IBBBP, and a frame number 1 732 that is a frame encoded and decoded prior to processing a frame number 5 740, is a reference frame.

In the frame number 1 732, an assumption is made that a motion is large in a width direction, and an intra-mode to inter mode ratio is large. In this case, a predictive block of a current block included in the frame number 5 740 is found by enlarging (733) a search range in the frame number 1 732 in a width direction.

Figure 7C:
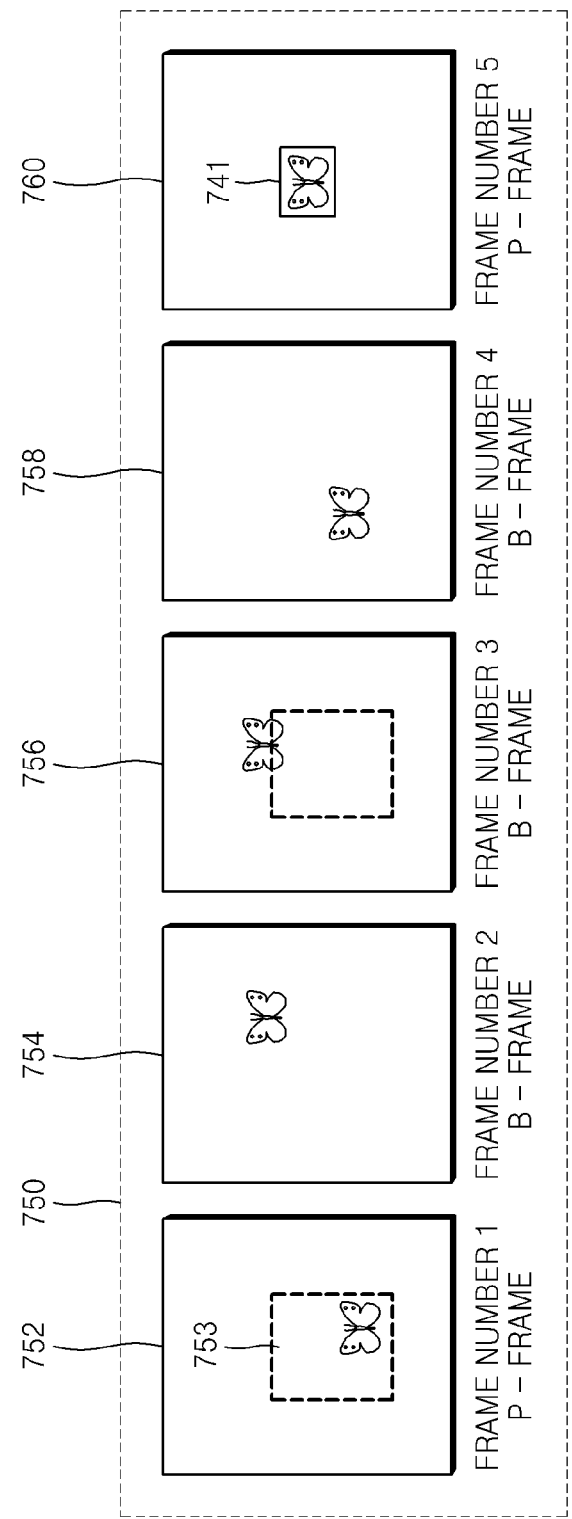
FIG. 7C is a diagram which illustrates an example in which a spatial search range and a temporal search range are adjusted in response to a motion vector having no directionality according to an exemplary embodiment.

FIG. 7C is a diagram which illustrates an example in which a spatial search range and a temporal search range are adjusted in response to a motion vector having no directionality according to an exemplary embodiment. In the exemplary embodiment of FIG. 7C, a GOP 730 is IPBPBP, and a frame number 3 756 that is a frame encoded and decoded prior to processing a frame number 5 760, is a reference frame. In FIG. 7C, only a PBPBP picture is illustrated.

In the frame number 3 756, it is assumed that a motion vector has no directionality, and an intra-mode to inter-mode ratio is large. In this case, a spatial search range is maintained as a basic value 753, and a predictive block of a current block included in the frame number 5 760 is found in the frame number 3 756 and the frame number 1 752 by enlarging a temporal search range.

Figure 8:
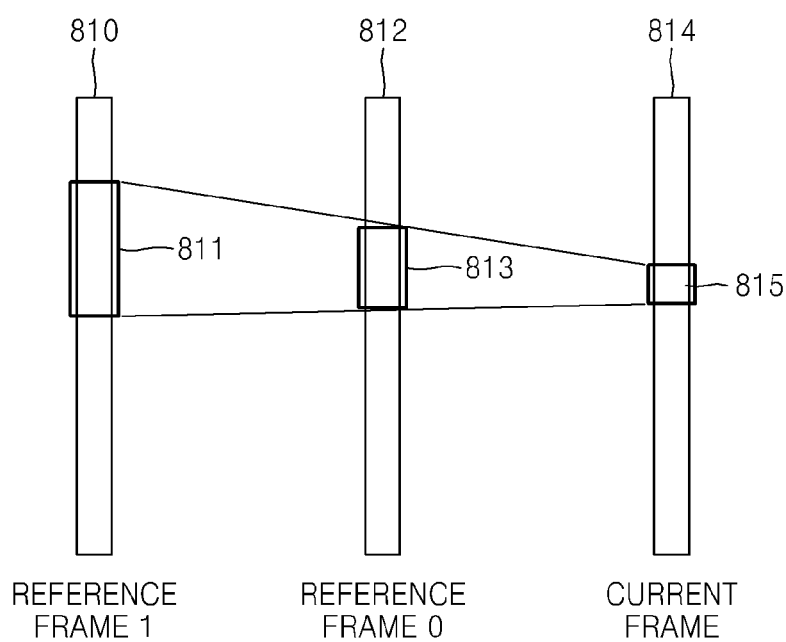
FIG. 8 is a diagram which illustrates an example in which a spatial search range is variably enlarged based on a distance between frames in response to there being a plurality of reference frames according to an exemplary embodiment.

FIG. 8 is a diagram which illustrates an example in which a spatial search range is variably enlarged based on a distance between frames when a plurality of reference frames exist according to an exemplary embodiment.

In the example, a temporal search range is determined up to a reference frame 0 812, which is a frame previous to a frame 814 including a current block 815, and a reference frame 1 810 previous thereto.

Referring to FIG. 8, a spatial search range 813 of the reference frame 0 812 and a spatial search range 811 of the reference frame 1 810 are enlarged in proportion to a distance between each of the reference frames and the frame 814 including the current block 815.

As an example, in response to the spatial search range 813 of the reference frame 0 812 previous to the frame 814 which includes the current block 815 is 'a', the spatial search range 811 of the reference frame 1 810 may be set to 4a, that is four times the distance. The increase rate may be variously applied according to a setting.

Figure 9:
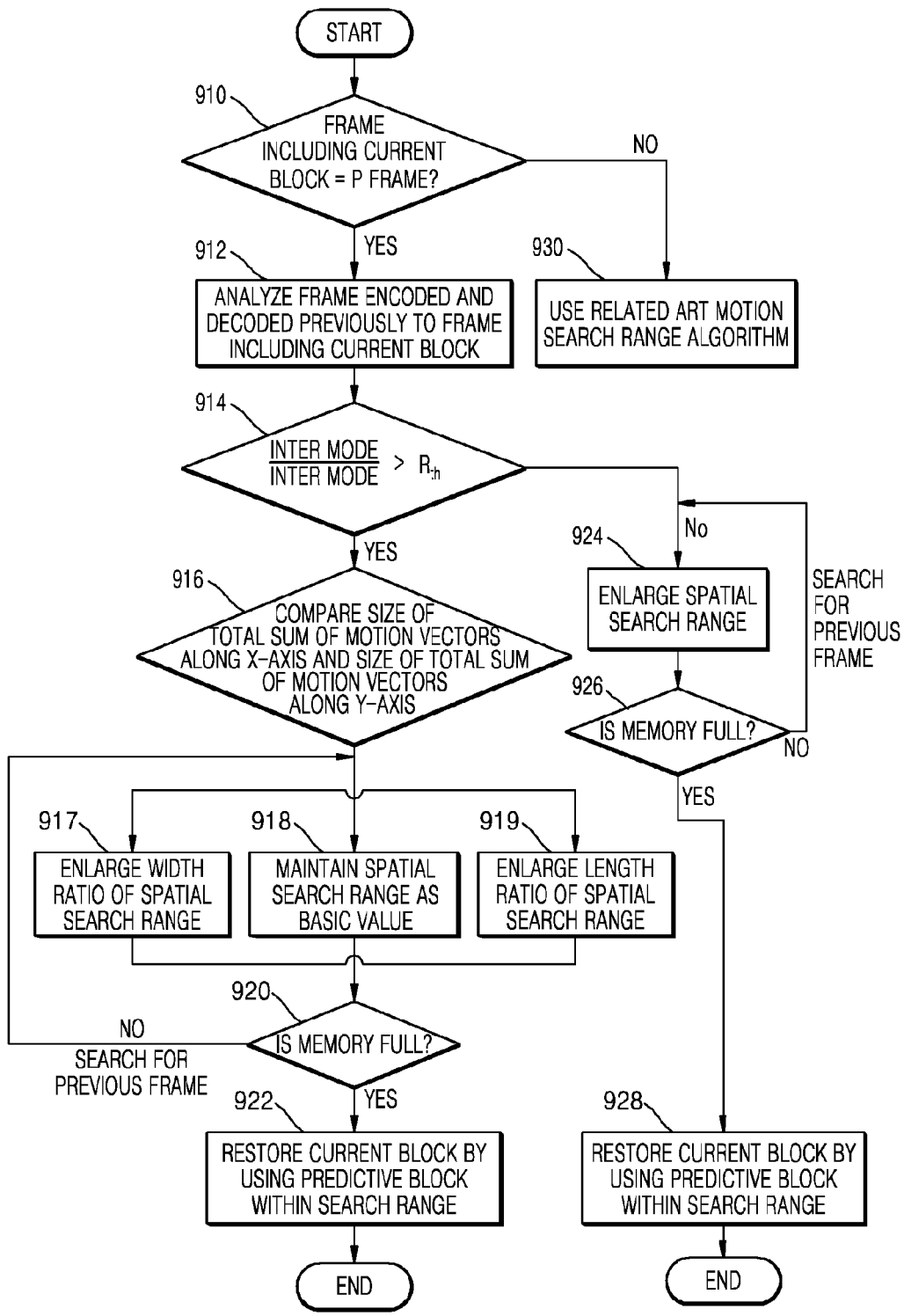
FIG. 9 is a flowchart which illustrates a method in which an encoder determines a temporal search range and a spatial search range according to an exemplary embodiment.

FIG. 9 is a flowchart which illustrates a method in which an encoder determines a temporal search range and a spatial search range according to an exemplary embodiment.

Referring to FIG. 9, in operation 910, the method determines whether a frame including a current block is a P frame. In response to a determination that the frame including the current block is not the P frame, a related art motion estimation search range algorithm is applied, and in response to a determination that the frame including the current block is the P frame, the method according to an exemplary embodiment is applied.

In operation 912, the method analyzes a frame which is encoded and decoded previously to a frame including a current block. Such an analysis operation includes calculating an intra-mode to inter-mode ratio of the frame which is encoded and decoded previously to the frame including the current block, and determining a directionality of the total sum of motion vectors.

In operation 914, in response to the intra-mod-to inter-mode ratio exceeding a certain value, the method compares a size of the total sum of motion vectors along the x-axis and a size of the total sum of motion vectors along the y-axis so as to analyze a motion vector, in operation 916.

In operation 917, in response to the size of the total sum of motion vectors along the x-axis being greater by a certain value or more than the total sum of motion vectors along y-axis as the comparison result, the method enlarges a width ratio of a spatial search range.

In operation 918, in response to a difference between the size of the total sum of motion vectors along the x-axis and the size of the total sum of motion vectors along the y-axis being less than a certain value, the method maintains the spatial search range as a basis value.

In operation 919, in response to the difference between the size of the total sum of motion vectors along the x-axis and the size of the total sum of motion vectors along the y-axis being less than the certain value, the method enlarges a length ratio of the spatial search range.

In operation 920, in response to a memory being filled by enlarging the spatial search range, the method restores the current block by using a predictive block within the spatial search range.

In response to the memory not being filled, the method enlarges a temporal search range, and uses a frame which is encoded and decoded one stage before as a reference frame. In this case, the method may enlarge the temporal search range within the memory limit.

In response to the intra-mode to inter-mode ratio being equal to or less than the certain value in operation 914, the method enlarges the spatial search range in operation 924. An enlargement ratio of the spatial search range may have various values according to a setting.

In operation 926, the method searches for the enlarged spatial search range, and then, in response to the memory not being filled, the method enlarges the temporal search range, and uses a frame which is encoded and decoded one stage before as a reference frame.

In this case, the method may enlarge the temporal search range within the memory limit. In response to the memory being filled, the method restores the current block by using the predictive block within a determined search range. In operation 928, in response to the memory being determined to be full in operation 926, the current block is restored using a predictive block within the search range.

Figure 10:
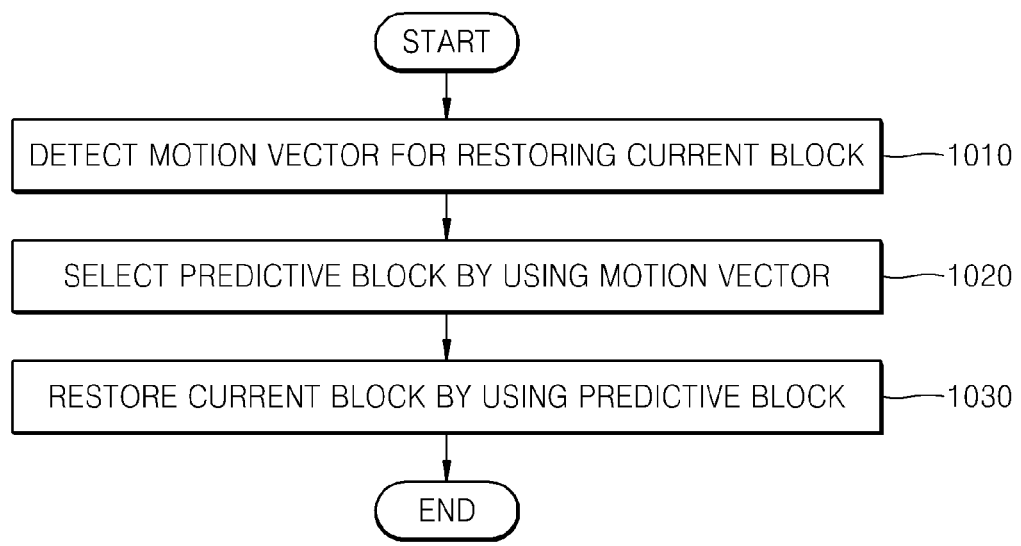
FIG. 10 is a flowchart which illustrates a method in which a decoder restores a current block according to a prediction signal received from the encoder according to an exemplary embodiment.

FIG. 10 is a flowchart which illustrates a method in which a decoder restores a current block according to a prediction signal received from the encoder according to an exemplary embodiment.

In operation 1010, in response to data that is output by performing entropy decoding, inverse rearrangement, dequantization, and inverse conversion operations on an encoded image being input, the method detects a motion vector of a current block from the data.

In operation 1020, the method generates a predictive block according to information included in a prediction signal by using the detected motion vector. The predictive block is included in a temporal search range and a spatial search range that are determined in the decoder according to a result of a motion information analysis of a frame which is encoded and decoded previously to a P frame including the current block. In operation 1030, the method restores the current block by using the generated predictive block.

TABLE 1

MOTION ESTIMATION

| FRAME NUMBER | Two Ref (BEFORE ALGORITHM APPLICATION) SEARCH RANGE 128 × 64 | ONE Ref SEARCH RANGE 256 × 64 | ONE Ref SEARCH RANGE 128 × 128 | PROPOSED ALGORITHM |
|---|---|---|---|---|
| 1 | 26.16 | 33.49 | 30.46 | 33.49 |
| 2 | 28.78 | 29.37 | 34.46 | 34.46 |
| 3 | 33.82 | 31.26 | 32.76 | 33.82 |
| 4 | 30.9 | 33.36 | 34.12 | 34.12 |
| 5 | 30.89 | 31.01 | 31.66 | 31.68 |
| 6 | 31.59 | 31.06 | 32.14 | 32.14 |
| 7 | 32.86 | 32.11 | 29.47 | 32.86 |
| 8 | 30.9 | 33.24 | 33.73 | 33.73 |
| 9 | 25.61 | 29.72 | 31.39 | 31.39 |
| 10 | 35.85 | 35.89 | 35.57 | 35.89 |
| 11 | 37.04 | 36.17 | 36.74 | 37.04 |
| 12 | 33.45 | 32.52 | 33.11 | 33.45 |
| 13 | 31.99 | 26.92 | 26.98 | 31.99 |
| 14 | 12.52 | 11.55 | 11.74 | 12.52 |
| 15 | 36.34 | 36.28 | 36.22 | 36.22 |
| 16 | 19.23 | 19.69 | 20.39 | 20.39 |
| 17 | 35.31 | 35.5 | 35.51 | 35.51 |
| 18 | 32.91 | 27.97 | 28.27 | 32.91 |
| 19 | 35.93 | 35.9 | 35.09 | 35.93 |
| 20 | 36.39 | 36.07 | 36.42 | 36.42 |
| AVERAGE | 30.9235 | 30.9535 | 31.3115 | 32.303 |

Table 1 shows a result in which image quality is enhanced by applying the image encoding method according to an exemplary embodiment.

In response to the exemplary embodiment being applied, a PSNR value is enhanced by about 1.4 from 30.9235 to 32.3030. The PSNR is measured in log units and is determined based on a ratio of an average square error between $(2^n-1)^2$, the original image and a damaged image or a video frame. $(2^n-1)^2$ denotes the square of the maximum number of samples which are in an image, and n denotes the number of bits of an image sample.

According to the exemplary embodiments, a predictive block of a current block is more accurately found by adjusting a search range on the basis of a motion change, and thus, image quality is prevented from being degraded.

Moreover, according to the exemplary embodiments, a target reference frame and a search range are determined in consideration of a motion of an image within a certain memory range, and thus, degradation of image quality is prevented without an increase in cost.

The exemplary embodiments may be implemented in the form of a storage medium that stores computer executable instructions, such as program modules, to be executed by a computer. Computer-readable media may be any available media that may be accessed by the computer and includes both volatile and nonvolatile media, removable and non-removable media. In addition, the computer-readable media may include computer storage media and communication media. Computer storage media includes both volatile and non-volatile, removable and non-removable media implemented as any method or technology for storage of information such as computer readable instructions, data structures, program modules, or other data. The communication medium is in the form of typical computer-readable instructions, data in a modulated data signal such as data structures, program modules, or other transport mechanism that includes any information delivery media.

The foregoing description of the exemplary embodiments is for illustrative purposes and one of ordinary skill in the technical field may modify it to other specific forms without changing the technical idea or essential features thereof. Therefore, the exemplary embodiments described above are exemplary in all respects and the disclosure is not limited thereto. For example, each component which may be distributed and carried out has been described as monolithic and describes that the components that are to be equally distributed in combined form, may be carried out.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments of the present invention have been described with reference to the appended figures, it will be understood by those of ordinary skill in the art that various changes in form and details may be made therein without departing from the spirit and scope of the present invention as defined by the following claims.

What is claimed is:

1. A method of encoding an adaptive search range decision in motion estimation, the encoding method comprising:
    determining intra-mode to inter-mode ratio based on motion information of a frame previous to a current frame including a current block;
    adjusting a spatial search range according to a motion vector of the reference frame in response to the intra-mode ratio exceeding a certain value; and
    performing motion estimation on the current block within the determined search range in order to generate a motion vector of the current block,
    wherein the adjusting the spatial search range includes:
    enlarging the spatial search range based on a difference between a size of a total sum of motion vectors along a first-axis of the reference frame and a size of a total sum of motion vectors along a second-axis of the reference frame.

2. The encoding method of claim 1, wherein,
    the current frame is a P frame, and
    the previous frame is encoded and decoded previously to the current frame.

3. The encoding method of claim 1, wherein the adjusting the spatial search range includes:
    enlarging the spatial search range in response to the intra-mode to inter-mode ratio being equal to or less than the certain value.

4. The encoding method of claim 1, wherein the adjusting of the spatial search range includes:
    enlarging a width ratio of the spatial search range in response to a size of a total sum of motion vectors along an x-axis of the previous frame being greater by a predetermined value or more than a size of a total sum of motion vectors along a y-axis of the previous frame;

enlarging a length ratio of the spatial search range in response to the size of the total sum of motion vectors along the y-axis of the previous frame is greater by the predetermined value or more than the size of the total sum of motion vectors along the x-axis of the previous frame; and maintaining the spatial search range as a basic value in response to a condition for the enlarging of a width ratio or the enlarging of a length ratio is not satisfied.

5. The encoding method of claim 1, wherein the determining of a temporal search range includes adjusting the temporal search range according to the determining of the spatial search range.

6. A method of decoding an adaptive search range decision in motion estimation, the decoding method comprising:
   detecting a motion vector of a current block from an encoded image; and
   generating, by using the motion vector, a predictive block included in a temporal search range and a spatial search range that are determined according to intra-mode to inter-mode ratio determined based on motion information of a frame previous to a current frame including a current block,
   wherein the determining of the spatial range includes:
   adjusting the spatial search range according to a motion vector of the reference frame in response to the intra-mode ratio exceeding a certain value and
   wherein the adjusting the spatial range includes:
   enlarging the spatial search range based on a difference between a size of a total sum of motion vectors along a first-axis of the reference frame and a size of a total sum of motion vectors along a second-axis of the reference frame.

7. The decoding method of claim 6, wherein,
   the current frame is a P frame, and
   the previous frame is encoded and decoded previously to the current frame.

8. The decoding method of claim 6, wherein the determining of the spatial search range includes:
   enlarging the spatial search range in response to the intra-mode to inter-mode ratio being equal to or less than the certain value.

9. The decoding method of claim 8, wherein the adjusting of the spatial search range includes:
   enlarging a width ratio of the spatial search range in response to a size of a total sum of motion vectors along an x-axis of the previous frame is greater by a predetermined value or more than a size of a total sum of motion vectors along an y-axis;
   enlarging a length ratio of the spatial search range in response to the size of the total sum of the motion vectors along the y-axis of the previous frame being greater by the predetermined value or more than the size of the total sum of the motion vectors along the x-axis; and
   maintaining the spatial search range as a basic value in response to a condition for the enlarging of a width ratio or the enlarging of a length ratio is not satisfied.

10. The decoding method of claim 6, wherein the determining of a temporal search range includes adjusting the temporal search range according to the determining of the spatial search range.

11. An encoding apparatus for an adaptive search range decision in motion estimation, the encoding apparatus comprising:

a motion information analyzer configured to determine intra-mode to inter-mode ratio based on motion information of a frame previous to a current frame which includes a current block;
a search region controller configured to adjust a spatial search range according to a motion vector of the reference frame in response to the intra-mode ratio exceeding a certain value; and
a predictor configured to perform motion estimation on the current block within the determined search range to generate a motion vector of the current block,
wherein the adjusting the spatial search range includes:
enlarging the spatial search range based on a difference between a size of a total sum of motion vectors along an first-axis of the reference frame and a size of a total sum of motion vectors along a second-axis of the reference frame.

12. The encoding apparatus of claim 11, wherein,
the current frame is a P frame, and
the previous frame is encoded and decoded previously to the current frame.

13. The encoding apparatus of claim 11, wherein,
the search range controller is configured to search the spatial search range in response to the intra-mode to inter-mode ratio being equal to or less than the certain value.

14. The encoding apparatus of claim 11, wherein the adjusting of the spatial search range includes:
enlarging a width ratio of the spatial search range in response to a size of a total sum of motion vectors along an x-axis of the previous frame being greater by a predetermined value or more than a size of a total sum of motion vectors along a y-axis of the previous frame;
enlarging a length ratio of the spatial search range in response to the size of the total sum of motion vectors along the y-axis of the previous frame being greater by the predetermined value or more than the size of the total sum of motion vectors along the x-axis; and
maintaining the spatial search range as a basic value in response to a condition for the enlarging of a width ratio or the enlarging of a length ratio not being satisfied.

15. The encoding apparatus of claim 11, wherein the determining of a temporal search range includes adjusting the temporal search range according to the determining of the spatial search range.

16. A decoding apparatus for an adaptive search range decision in motion estimation, the decoding apparatus comprising:
a motion information detector configured to detect a motion vector of a current block from an encoded image; and
a predictive block generator configured to generate, by using the motion vector, a predictive block included in a temporal search range and a spatial search range that are determined according to intra-mode to inter-mode ratio determined based on motion information of a frame previous to a current frame including a current block,
wherein the determining of the spatial range includes:
adjusting the spatial search range according to a motion vector of the reference frame in response to the intra-mode ratio exceeding a certain value and
wherein the adjusting the spatial range includes:
enlarging the spatial search range based on a difference between a size of a total sum of motion vectors along a first-axis of the reference frame and a size of a total sum of motion vectors along a second-axis of the reference frame.

17. The decoding apparatus of claim 16, wherein,
    the current frame is a P frame, and
    the previous frame is encoded and decoded previously to the current frame.

18. The decoding apparatus of claim 16, wherein the determining of the spatial search range includes:
    enlarging the spatial search range in response to the intra-mode to inter-mode ratio being equal to or less than the certain value.

19. The decoding apparatus of claim 18, wherein the adjusting of the spatial search range includes:
    enlarging a width ratio of the spatial search range in response to a size of a total sum of motion vectors along an x-axis of the previous frame being greater by a predetermined value or more than a size of a total sum of motion vectors along a y-axis of the previous frame;
    enlarging a length ratio of the spatial search range in response to the size of the total sum of motion vectors along the y-axis of the previous frame being greater by the predetermined value or more than the size of the total sum of motion vectors along the x-axis of the previous frame; and
    maintaining the spatial search range as a basic value in response to a condition for the enlarging of a width ratio or the enlarging of a length ratio not being satisfied.

20. The decoding apparatus of claim 16, wherein the determining of a temporal search range includes adjusting the temporal search range according to the determining of the spatial search range.

* * * * *